United States Patent
Kim et al.

(10) Patent No.: US 10,896,313 B2
(45) Date of Patent: Jan. 19, 2021

(54) METHODS AND DEVICES FOR RECOGNIZING FINGERPRINT

(71) Applicant: SAMSUNG ELECTRONICS CO., LTD., Suwon-si (KR)

(72) Inventors: Hyunjoon Kim, Seoul (KR); Jingu Heo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/299,364

(22) Filed: Mar. 12, 2019

(65) Prior Publication Data
US 2020/0012844 A1    Jan. 9, 2020

(30) Foreign Application Priority Data
Jul. 4, 2018   (KR) .................. 10-2018-0077896

(51) Int. Cl.
  *G06K 9/00*   (2006.01)
  *G06K 9/46*   (2006.01)

(52) U.S. Cl.
  CPC ..... *G06K 9/00087* (2013.01); *G06K 9/00067* (2013.01); *G06K 9/4642* (2013.01)

(58) Field of Classification Search
  CPC .......... G06K 9/00087; G06K 9/00067; G06K 9/4642
  See application file for complete search history.

(56) References Cited

U.S. PATENT DOCUMENTS

| 7,970,185 B2 | 6/2011 | Kim et al. |
| 9,424,458 B1 | 8/2016 | Mather et al. |

(Continued)

FOREIGN PATENT DOCUMENTS

| KR | 10-0891324 B1 | 3/2009 |
| KR | 10-2014-0045748 A | 4/2014 |

(Continued)

OTHER PUBLICATIONS

Liu, Feng et al., "Touchless Multiview Fingerprint Acquisition and Mosaicking", IEEE Transactions on Instrumentation and Measurement, vol. 62, No. 9, Sep. 2013, pp. 2492-2502. (12 pages total).

(Continued)

*Primary Examiner* — Stephen G Sherman
(74) *Attorney, Agent, or Firm* — Sughrue Mion, PLLC

(57) ABSTRACT

A method of recognizing a fingerprint includes generating, by using a fingerprint sensor, an input fingerprint image that is to be used when a fingerprint verification mode is executed; obtaining, from a memory, a registered fingerprint image that is generated from a finger image captured by a camera and stored in the memory prior to the generating the input fingerprint image; determining, from among partial regions of a registered fingerprint image that is obtained, a partial region of the registered fingerprint image, which is superimposed on the input fingerprint image, as a registered superimposed image; converting the registered superimposed image such that a first histogram of the registered superimposed image corresponds to a second histogram of the input fingerprint image; and determining, by comparing the registered superimposed image, which is converted, with the input fingerprint image, whether the input fingerprint image is verified.

17 Claims, 10 Drawing Sheets

(56) References Cited

U.S. PATENT DOCUMENTS

| | | | | |
|---|---|---|---|---|
| 2003/0091724 A1* | 5/2003 | Mizoguchi | ......... | G06K 9/00087 |
| | | | | 427/1 |
| 2009/0285459 A1* | 11/2009 | Aggarwal | .......... | G06K 9/00073 |
| | | | | 382/125 |
| 2012/0188055 A1* | 7/2012 | Sahin | ...................... | H04L 67/10 |
| | | | | 340/5.82 |
| 2017/0004346 A1* | 1/2017 | Kim | ................... | G06K 9/00926 |
| 2018/0075277 A1 | 3/2018 | Lee | | |

FOREIGN PATENT DOCUMENTS

| KR | 10-2015-0003501 A | 1/2015 |
|---|---|---|
| KR | 10-2016-0009821 A | 1/2016 |
| KR | 10-1596298 B1 | 2/2016 |
| KR | 10-2017-0003361 A | 1/2017 |

OTHER PUBLICATIONS

Hong, Lin et al., "Fingerprint Image Enhancement: Algorithm and Performance Evaluation", IEEE Transaction on Pattern Analysis and Machine Intelligence, vol. 20, No. 8, Aug. 1998, pp. 777-789. (13 pages total).

\* cited by examiner

METHODS AND DEVICES FOR RECOGNIZING FINGERPRINT

CROSS-REFERENCE TO RELATED APPLICATION

This application claims priority from Korean Patent Application No. 10-2018-0077896, filed on Jul. 4, 2018 in the Korean Intellectual Property Office, the disclosure of which is incorporated herein in its entirety by reference.

BACKGROUND

1. Field

The present disclosure relates to methods and devices for recognizing a fingerprint, and more particularly, to methods and devices for recognizing a fingerprint by using a camera and a fingerprint sensor.

2. Description of the Related Art

As various functions become available in electronic devices, security for information stored in such electronic devices are gaining greater importance, and according to needs for better security, verification technologies based on user biometrics are being developed. Verification technologies based on biometrics may, for example, include obtaining user biometrics including a fingerprint, irises, a voice, a face, blood vessels, and the like, and determining whether the user is a verified user by comparing the user biometrics to biometrics of previously registered users.

Among the above-mentioned verification technologies, fingerprint recognition technology is most widely used due to reasons such as convenience, security, economic efficiency, and the like. Fingerprint recognition technology may enhance security for user devices and enable various application services such as mobile payment.

As form factors of various electronic devices tend to have smaller sizes, a fingerprint sensing region of a fingerprint sensor that is included in an electronic device for recognizing a fingerprint is getting smaller. Accordingly, when a user attempts to verify his/her fingerprint, a successful fingerprint verification rate may decrease.

SUMMARY

Provided are a method and a device for recognizing a fingerprint. Provided is a computer-readable recording medium storing instructions for executing the methods by using a processor. Technical objectives of the present disclosure are not limited to the above-mentioned objectives, and other objectives may become apparent to those of ordinary skill in the art based on the following descriptions.

Additional aspects will be set forth in part in the description which follows and, in part, will be apparent from the description, or may be learned by practice of the presented embodiments.

According to an aspect of an embodiment, a method of recognizing a fingerprint may include: generating, by using a fingerprint sensor, an input fingerprint image that is to be used when a fingerprint verification mode is executed; obtaining, from a memory, a registered fingerprint image that is generated from a finger image captured by a camera and stored in the memory prior to the generating the input fingerprint image; determining, from among partial regions of the registered fingerprint image that is obtained, a partial region of the registered fingerprint image, which is superimposed on the input fingerprint image, as a registered superimposed image; converting the registered superimposed image such that a first histogram of the registered superimposed image corresponds to a second histogram of the input fingerprint image; and determining, by comparing the registered superimposed image that is converted with the input fingerprint image, whether the input fingerprint image is verified.

According to an aspect of another embodiment, an electronic device may include: a camera configured to capture, in a fingerprint registration mode, a finger image of a user; a memory configured to store, when the fingerprint registration mode is executed, a registered fingerprint image that is generated from the finger image that is captured by the camera; a fingerprint sensor configured to sense a fingerprint in a fingerprint verification mode; and a processor. The processor is configured to generate, by using the fingerprint sensor, an input fingerprint image that is to be used when the fingerprint verification mode is executed; obtain, from the memory, the registered fingerprint image that is stored in the memory, prior to the generating the input fingerprint image, in the fingerprint registration mode; determine, from among partial regions of the registered fingerprint image that is obtained, a partial region of the registered fingerprint image that is superimposed on the input fingerprint image as a registered superimposed image; convert the registered superimposed image such that a first histogram of the registered superimposed image corresponds to a second histogram of the input fingerprint image; and determine, by comparing the registered superimposed image that is converted with the input fingerprint image, whether the input fingerprint image is verified.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
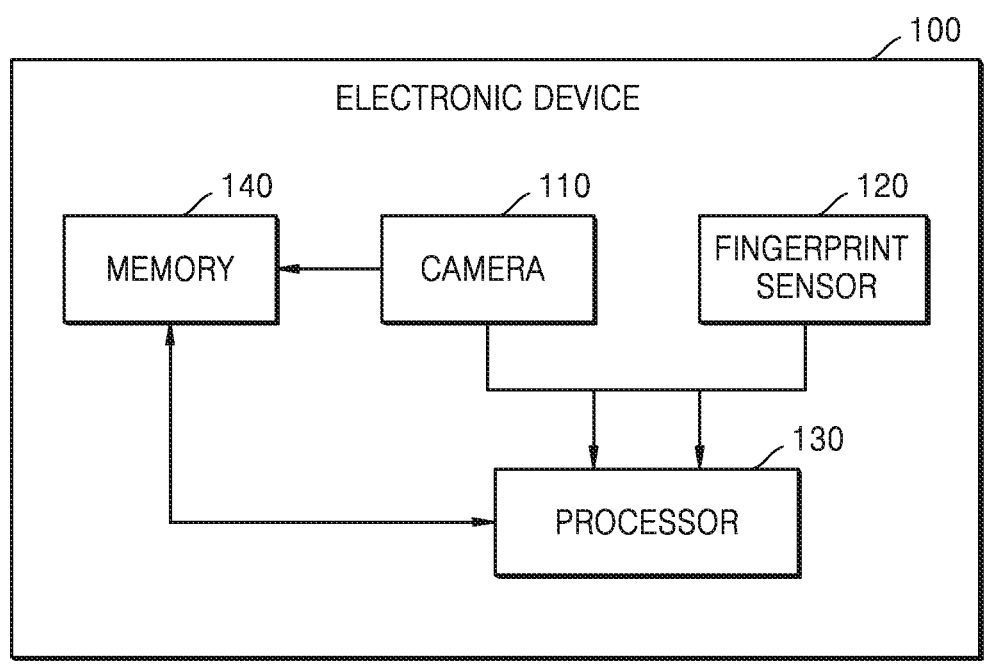
FIG. 1 is a block diagram showing a configuration of an electronic device that recognizes a fingerprint, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to figures, to explain aspects. As used herein, the term "and/or" includes any and all combinations of one or more of the associated listed items. Expressions such as "at least of," when preceding a list of elements, modify the entire list of elements and do not modify the individual elements of the list.

Most of the terms used herein are general terms that have been widely used in the technical art to which the present disclosure pertains. However, some of the terms used herein may be changed reflecting intentions of technicians in this art, precedents, or new technologies. Also, some of the terms used herein may be arbitrarily chosen by the present applicant. In this case, these terms will be written in detail in descriptions of related embodiments. Accordingly, the specific terms used herein will be understood based on the unique meanings thereof and the whole context of the present disclosure.

Throughout the descriptions of the embodiments, it will be understood that when an element is referred to as being "connected" to another element, it may be "directly connected" to the other element or "electrically connected" to the other element with intervening elements therebetween. It will further be understood that when a part "includes" or "comprises" an element, unless otherwise defined, the part may further include other elements, not excluding the other elements.

Terms such as "comprising" or "including" that are used in the embodiments should not be construed as necessarily including all of components or steps written in the specification. Some of the components or the steps may not be included, and alternatively, additional components or steps may further be included.

Descriptions of the embodiment should not be construed to limit the scope of a right, and descriptions that may be easily inferred by one of ordinary skill in the art should be construed to be in the scope of the right of the embodiments. Hereinafter, embodiments that are merely used as examples will be described in detail with reference to attached drawings.

FIG. 1 is a block diagram showing a configuration of an electronic device 100 that recognizes a fingerprint, according to an embodiment.

Referring to FIG. 1, the electronic device 100 includes a camera 110, a fingerprint sensor 120, a processor 130, and a memory 140. Only components related to embodiments are included in the electronic device 100 shown in FIG. 1. Accordingly, it is obvious to one of ordinary skill in the art that other widely-used components may be further included in addition to the components shown in FIG. 1.

The electronic device 100 may be a mobile device including a smart phone, a smart watch, a tablet personal computer (PC), a laptop computer, a personal digital assistant (PDA), a portable multimedia player (PMP), and the like. The electronic device 100 may, but is not limited to, include a PC, a tablet PC, and a PDA.

The electronic device 100 may be used for recognizing a user's fingerprint by using the camera 110 and the fingerprint sensor 120.

More particularly, an operation of recognizing the user's fingerprint by using the electronic device 100 may include an operation of verifying the user by recognizing the user's fingerprint. The operation of verifying the user may include an operation of determining whether the user is a previously registered user or an operation of determining a user from among a plurality of registered users that corresponds to the user.

For example, in a registration operation, the electronic device 100 may, in advance, store an image of the user's fingerprint or information regarding the image of the user's fingerprint (for example, information regarding minutiae, phase degree based on a domain conversion method, and the like) as registration information. In a verification operation, that is, when the user uses the electronic device 100 or attempts to access the electronic device 100, the electronic device 100 may obtain the image of the user's fingerprint that is input via the fingerprint sensor 120. In addition, in the verification operation, the electronic device 100 may compare the fingerprint image, which is input by the user, to an image of a user's fingerprint that is previously registered, thereby determining whether the user is previously registered. Alternatively, the electronic device 100 may compare the fingerprint image, which is input by the user, to fingerprint images of a plurality of previously registered users and identify to which user the fingerprint image belongs.

The electronic device 100 may output a signal for "true" when the fingerprint image that is input matches the fingerprint image of the previously registered user and output a signal for "false" when the fingerprint image that is input does not match the fingerprint image of the previously registered user. In addition, when the fingerprint image that is input matches one of the fingerprint images of the plurality of previously registered users, the electronic device 100 may output an identification number (ID) of the previously registered user who has the fingerprint image that matches the fingerprint image that is input. When the fingerprint image that is input does not match any one of the fingerprint images of the plurality of previously registered users, the electronic device 100 may output a signal to inform that the user is not identified.

The camera 110 may be embedded in the electronic device 100. The camera 110 may, for example, be on a front surface or a rear surface of a smart phone.

As cameras embedded in mobile devices and the like come to have higher resolutions, images having high resolutions may be obtained. Accordingly, the camera 110 may obtain the fingerprint image by capturing an image of the user's finger that is placed in front of the camera 110. The fingerprint image that is obtained, which is the registration information of the user, may be used for generating the registered fingerprint image in a fingerprint registration mode.

The camera 110 may be operated to capture the user's fingerprint image when an application for registering a fingerprint is executed in the electronic device 100, such as a smart phone.

The fingerprint sensor 120 may, when the user uses the electronic device 100 or attempts to access the electronic device 100, be used for the user to input a fingerprint in a fingerprint verification mode for verifying whether the user is previously registered.

The fingerprint sensor 120 may sense a fingerprint in a part of the user's finger by using a fingerprint sensing region. The fingerprint sensed by the fingerprint sensor 120 may be used for generating an input fingerprint image. As form factors of various electronic devices become smaller, the fingerprint sensing region of the fingerprint sensor tends to decrease, for example, to about 20 mm$^2$. Accordingly, the input fingerprint image of the user, which is generated by the fingerprint sensor 120, may be an image that occupies a region smaller than that of the registered fingerprint image of the user that is previously registered by using the camera 110.

Although the fingerprint sensing region of the fingerprint sensor 120 may be circular or rectangular, a size and a form of the fingerprint sensing region may be variously modified.

The fingerprint sensor 120 may include a capacitive fingerprint sensor module. In addition, the fingerprint sensor 120 may, but is not limited to, include a semiconductor type fingerprint sensor, for example, a thermal sensing type sensor, an electric field type sensor, and the like, or an optical fingerprint sensor.

The fingerprint sensor 120 that is capacitive may obtain the form of the fingerprint (i.e., a fingerprint pattern) by detecting changes in electrostatic capacity according to valleys and ridges of a fingerprint when a human finger approaches a conductive sensing electrode. When the electronic device 100 is, for example, a smart phone, the fingerprint sensor 120 that is capacitive may be placed below a home button of the smart phone or the rear surface of the smart phone.

The processor 130 is hardware that controls all operations and functions of the electronic device 100. The processor 130 may, from/to the memory 140, read/write data that is processed in the electronic device 100, for example, the registered fingerprint image, the registered characteristic information extracted from the registered fingerprint image, and execute the electronic device 100 by using the data that is read from/written to the memory 140.

More particularly, in the fingerprint registration mode, the processor 130 may generate the registered fingerprint image from the camera 110 and may, in advance, store the registered fingerprint image in the memory 140 as user registration information.

The processor 130 may generate the input fingerprint image from the fingerprint sensor 120 in the fingerprint verification mode of verifying whether the user is previously registered. In this case, the processor 130 may, from the memory 140, read and obtain the registered fingerprint image that is stored in the memory 140 in the fingerprint registration mode. The processor 130 may compare the registered fingerprint image, which is obtained from the memory 140, with the input fingerprint image to determine whether the input fingerprint image is a fingerprint image of the previously registered user. In this case, to compare the registered fingerprint image with the input fingerprint image that is generated by using different methods, the processor 130 may convert one of the registered fingerprint image and the input fingerprint image to be similar to another one of the registered fingerprint image and the input fingerprint image. More particularly, the processor 130 may determine whether the user is verified based on pattern similarity between the registered fingerprint image and the input fingerprint image and similarity between characteristic information of the registered fingerprint image and characteristic information of the input fingerprint image.

The processor 130 may, but is not limited to, be embodied as a central processing unit (CPU), a graphics processing unit (GPU), an application processor (AP), or the like that is included in the electronic device 100.

The memory 140 may store data that is processed or to be processed in the electronic device 100. For example, in the fingerprint registration mode, the memory 140 may store the registered fingerprint image that is generated from the finger image shot by using the camera 110, the characteristic information that is extracted from the registered fingerprint image, and the like. In addition, the memory 140 may also store values, which are calculated by the processor 130, that respectively indicate pattern similarity between the registered fingerprint image and the input fingerprint image and similarity between characteristic information of the registered fingerprint image and characteristic information of the input fingerprint image.

The memory 140 may, but is not limited to, include random access memory (RAM) such as dynamic random access memory (DRAM), static random access memory (SRAM), read-only memory (ROM), electrically erasable programmable read-only memory (EEPROM), a compact disc ROM (CD-ROM), a Blu-ray disc (BD) or another optical disc storage, a hard disk drive (HDD), a solid-state drive (SSD), or flash memory.

Figure 2:
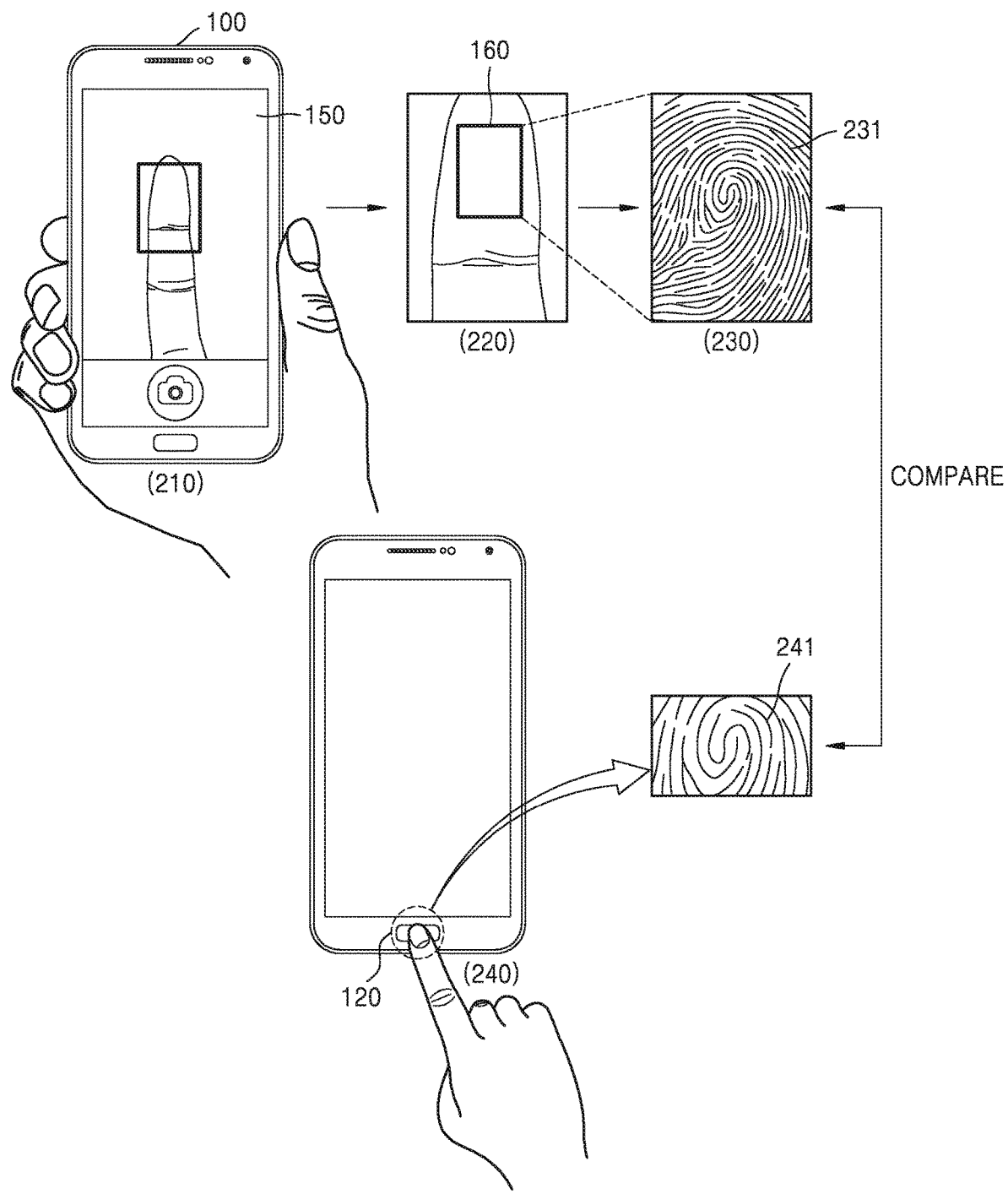
FIG. 2 is a diagram for describing a process of recognizing a fingerprint by using the electronic device, according to an embodiment.

FIG. 2 is a diagram for describing a process of recognizing the fingerprint by using the electronic device 100, according to an embodiment.

The process of fingerprint recognition shown in FIG. 2 may be a fingerprint recognition process performed by using the electronic device 100 shown in FIG. 1. The electronic device 100 shown in FIG. 2 may include the camera 110, the fingerprint sensor 120, the processor 130, and the memory 140.

Although the electronic device 100 in FIG. 2 is shown as a smart phone, the electronic device 100 is not limited thereto and may be one of various electronic devices.

The electronic device 100 shown in FIG. 2 registers fingerprint information of the user in advance in operations 210 through 230 in the fingerprint registration mode and receives an input of a fingerprint image for verification from the user in operation 240 in the fingerprint verification mode.

In operation 210, the camera 110 may obtain a fingerprint image by capturing the image of the user's finger that is in a certain distance away from and in front of the camera 110.

The electronic device 100 may include a display 150 that provides real-time preview of the image that is input via the camera 110. Although it is not shown in FIG. 2, a finger guide may be provided in the display 150 of the electronic device 100 for performing a notification operation to output a sound or an image that guides the user to position her finger at an ideal or recommended location for capturing the image.

To obtain the registered fingerprint image of the user by using the camera 110 in the electronic device 100, a flash may be turned on while the fingerprint is being shot such that the valleys and ridges of the fingerprint are clearly seen. In addition, the camera 110 may obtain a fingerprint image by taking consecutive shots from about one time to about five times, and the processor 130 may, from among a plurality of fingerprint images, select a fingerprint image in which the valleys and the ridges of the fingerprint are most clearly seen.

In operation 220, the processor 130 in the electronic device 100 may select a region of interest (ROI) 160 from the fingerprint image that is obtained. The ROI 160 may be an arbitrary region in the fingerprint image. For example, the ROI 160 may, but is not limited to, be set as a region having an appropriate size in a first node of the finger.

In operation 230, as the fingerprint image corresponding to the ROI 160 is a color image, the processor 130 in the electronic device 100 may, for example, convert the color image into a grayscale image.

Conversion into a grayscale image indicates forming a black-and-white image, for each pixel on a color screen, by setting contrast or concentration of black and white instead of colors. In the user verification operation, as the user's fingerprint image that is to be input via the fingerprint sensor 120 is a black-and-white image, it is required that the images are converted into black-and-white images to determine whether the user's fingerprint image that is to be input matches the registered fingerprint image.

The fingerprint image that is generated through the conversion into the grayscale image may be stored in the memory 140 as a registered fingerprint image 231. In addition, characteristic information regarding the fingerprint, for example, minutiae, may be extracted from the registered fingerprint image 231. The characteristic information extracted from the registered fingerprint image 231 may be stored in the memory 140.

In operation 240, when the user attempts to verify (i.e., authenticate) his/her fingerprint, the fingerprint sensor 120 may sense a part of the user's finger via the fingerprint sensing region. Although the fingerprint sensing region of the fingerprint sensor 120 may be circular or rectangular, the size and shape of the fingerprint sensing region may vary.

The fingerprint that is sensed by using the fingerprint sensor 120 may be used for generating an input fingerprint image 241.

The fingerprint sensor 120 shown in FIG. 2, which is shown as being on the home button of the smart phone, may also be in other regions such as the rear surface of the smart phone.

The processor 130 included in the electronic device 100 may, from the memory 140, obtain the registered fingerprint image 231 that is generated in operations 210 through 230 in the fingerprint verification operation and stored in the memory 140. The processor 130 may verify the user by using the registered fingerprint image 231 that is obtained from the memory 140 and the input fingerprint image 241 that is generated in operation 240. More particularly, the processor 130 may generate the registered superimposed image, which is a region that overlaps the input fingerprint image 241 in the registered fingerprint image 231 and may compare the registered superimposed image with the input fingerprint image 241. Furthermore, the processor 130 may determine whether the user is verified, by determining the matching degree between the patterns of the registered superimposed image and the input fingerprint image.

As it is described above, by capturing the fingerprint image by using the camera 110, a registered fingerprint image having a wide region may be generated from the fingerprint image. On the other hand, during the user verification operation, the fingerprint may be sensed by using the fingerprint sensor 120 that has a relatively narrow fingerprint recognition region and the input fingerprint image may be generated from the fingerprint that is sensed.

Meanwhile, when the fingerprint is registered by using the fingerprint sensor 120 that has the relatively narrow fingerprint sensing region instead of the camera 110, it is difficult to obtain sufficient fingerprint characteristic information in the registered fingerprint image and a fingerprint region, which may be compared with the fingerprint image that is sensed in the verification operation, may be narrow, and thus, a verification error may occur. However, the fingerprint image that is registered by using the camera 110 according to the embodiment may obtain more sufficient fingerprint characteristic information compared with the case of only using the fingerprint sensor 120, and the fingerprint image has a wide fingerprint region that may be compared with the fingerprint image that is sensed in the verification operation, and thus, a fingerprint verification rate may increase in the fingerprint verification operation. In addition, as the fingerprint image having the wide region that is obtained by using the camera 110 may sufficiently secure minutiae of the fingerprint, the security may be increased.

Figure 3:
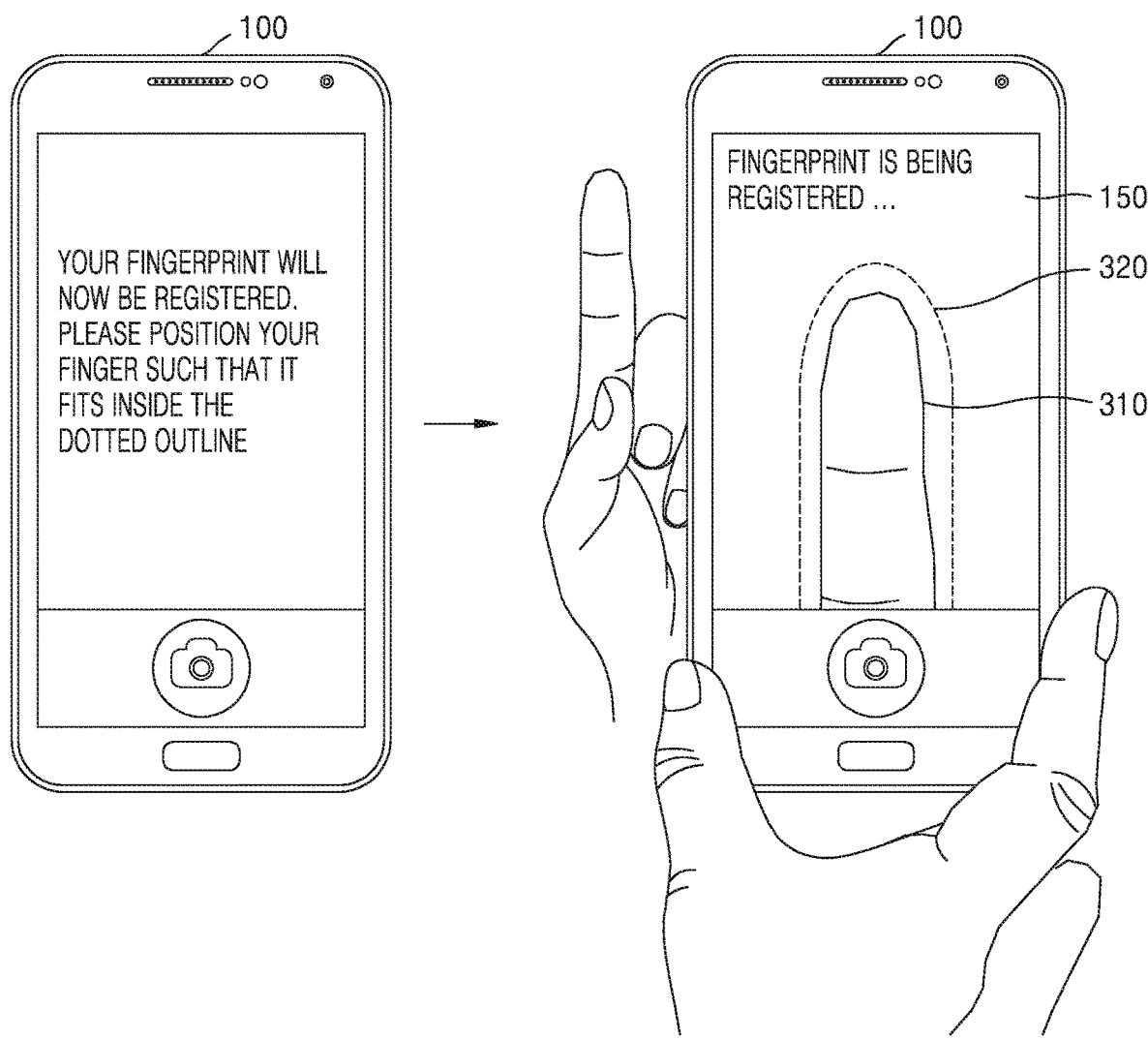
FIG. 3 is a diagram for describing an example of an application that may be used for registration of a fingerprint, according to an embodiment.

FIG. 3 is a diagram for describing an application that may be used for registering a fingerprint, according to an embodiment.

Referring to FIG. 3, after executing an application used for registering the fingerprint, an instruction message may be displayed on the display 150 of the electronic device 100 for guiding the user through the registration process. In addition, when the instruction message disappears and the camera 110 is executed, a finger guide 320, in which the user may fit a finger 310, may be displayed on the display 150 of the electronic device 100. However, FIG. 3 merely shows an example of the application that is used for registering the fingerprint, and the embodiment is not limited thereto.

When the user's fingerprint is registered, a registered fingerprint image may be generated by capturing an image of a fingerprint of the user's finger 310 by using the camera 110. In this case, when the electronic device 100 is a smart phone, the fingerprint image may be obtained by using specific application designed for registering the fingerprint rather than a basic camera application of the smart phone.

When the application used for registering the fingerprint is executed, an instruction message that guides the user to fit the user's finger 310 in the finger guide 320 may be displayed on the display 150 of the electronic device 100. The finger guide 320 may be formed into an inverted "U" shape (e.g., a dotted outline).

However, as the user has to hold up the electronic device 100 by a hand and simultaneously fit the user's finger 310, which is a subject, in the finger guide 320, it may be difficult for the user to accurately fit the finger 310 in the finger guide 320. Accordingly, a notification operation may be performed to output a sound or an image that allows capturing of the image when the user's finger 310 approximately fits in the finger guide 320. For example, the image may be taken automatically without a user intervention when the user's finger 310 is placed within the finger guide 320. In addition, when the user's finger 310 is not shot within the finger guide 320, a correction operation may be performed to correct the image of the user's finger 310 to fit in the finger guide 320.

When the camera 110 is operated to capture the fingerprint after the application is executed, the flash may be turned on to create a higher contrast between the background and the user's finger 310 (e.g., the background would appear darker compared to the user's finger 310 that is lit), and the ridges of the fingerprint are clearly seen. Alternatively, the application may include a function to recognize brightness around the user's finger and adjust the brightness of the image.

Additionally, the application may have a live finger detection (LFD) function to identify whether the image of the user's finger 310 on the display 150 in the electronic device 100 is a fingerprint of a real human body.

For protection of privacy, the fingerprint image of the user may be separately stored in a security region in a memory included in the application in control of the processor 130. In this case, information regarding the fingerprint image of the user may be encrypted and stored in the security region of the memory in the application.

Accordingly, in terms of security, instead of the basic camera application, it may be appropriate to use a dedicated application for registering the fingerprint.

Figure 4:
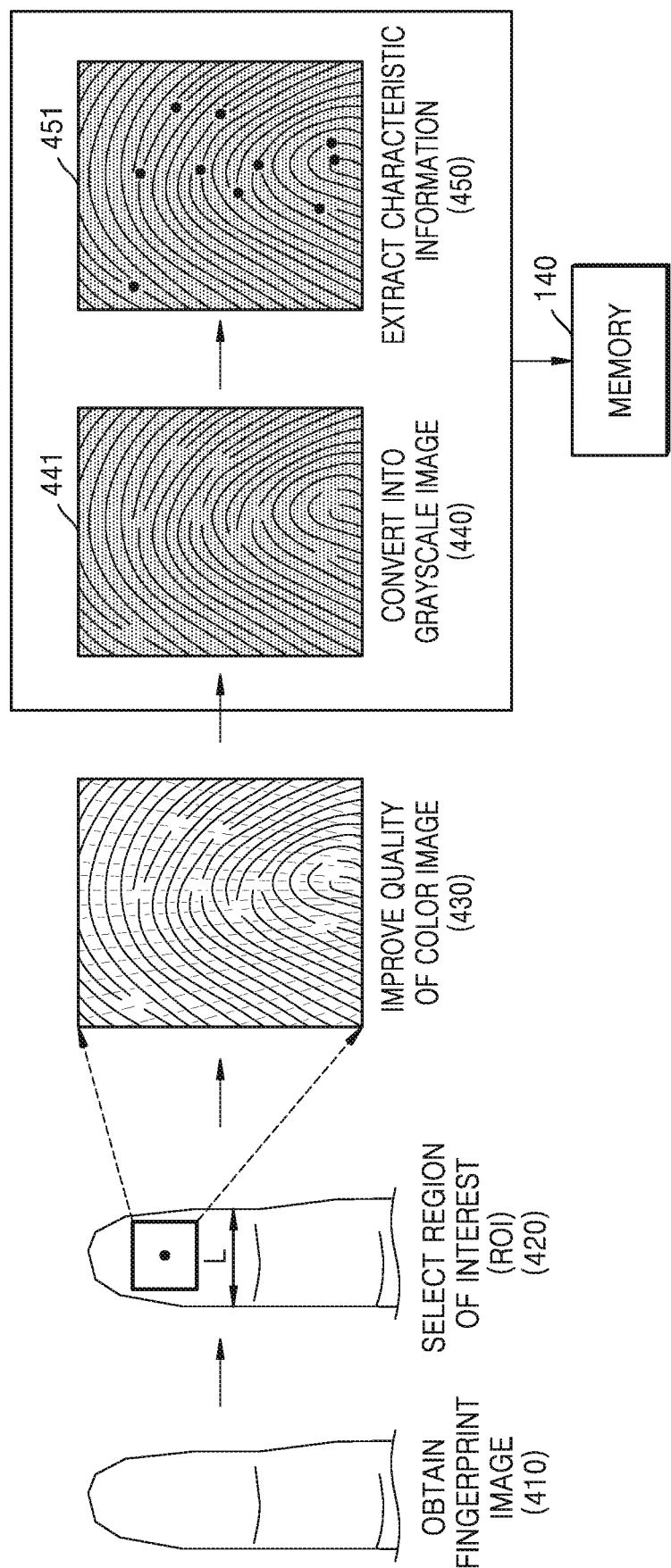
FIG. 4 is a diagram for describing a process of generating a registered fingerprint image, according to an embodiment.

FIG. 4 is a diagram for describing a process of generating a registered fingerprint image 441, according to an embodiment.

The process of generating the registered fingerprint image 441 shown in FIG. 4 may be a process of generating a registered fingerprint image by using the electronic device 100 in FIG. 1.

In operation 410, the camera 110 in the electronic device 100 may capture the user's finger to generate a fingerprint image.

In operation 420, the ROI may be established in the fingerprint image that is obtained by using the processor 130 in the electronic device 100. The ROI may be an arbitrary region in the fingerprint image. The ROI may be a region having an appropriate width at a center of gravity in a first node of the finger. When a width of the finger is L, a square region that has a horizontal length and a vertical length of 0.6 L may be set as the ROI.

In operation 430, the processor 130 may improve color quality of the fingerprint image in the ROI that is obtained in operation 420.

In operation 440, the processor 130 may convert the fingerprint image having the improved color quality in the ROI to a grayscale image. Each pixel included in a color image has pixel values that respectively indicate brightness of three original colors, that is, red (R), green (G), and blue (B). The processor 130 may, in each pixel included in the fingerprint image in the ROI, determine an average value of values that respectively indicate brightness of the three original colors as a gray level. The fingerprint image in the ROI region may be converted into the grayscale image by using the method that is described above, but the present disclosure is not limited thereto and there may be various methods for converting the fingerprint image. In addition, the processor 130 may improve the quality of the fingerprint in the ROI, which is converted into the grayscale image, such that the ridges and the valleys of the fingerprint are clearly distinguished. For example, the image quality may be improved by reducing changes in gray levels of the pixels placed along the ridges and the valleys of the fingerprint, but the embodiment is not limited thereto.

As it is described above, the fingerprint image in the ROI, which is converted into the grayscale image and has improved quality, may be stored in the memory 140 as a registered fingerprint image 441 of the user.

In operation 450, characteristic information regarding the fingerprint may be extracted from the registered fingerprint image 441. The characteristic information extracted from the registered fingerprint image 441 is referred to as registered characteristic information 451. The registered characteristic information 451, which is information indicating characteristics of the registered fingerprint image, may, but is not limited to, be information regarding minutiae. The registered characteristic information 451 may include scale-invariant feature transform (SIFT) information, phase information that is extracted from the registered fingerprint image 441 based on the frequency domain conversion method, and the like.

The minutiae, which refer to fine interest points such as ridge ends or bifurcations of lines found in a fingerprint, may not be easily and sufficiently obtained as a fingerprint sensing region of a fingerprint sensor may be too narrow due to a trend toward miniaturization of electronic devices. However, when the registered fingerprint image 441 having a wide region is generated by capturing the fingerprint image by using the camera 110, a sufficient number of minutiae may be obtained.

The registered characteristic information 451 that is extracted from the registered fingerprint image 441 may, as registration information of the user, be stored in the memory 140 together with the registered fingerprint image 441.

Figure 5:
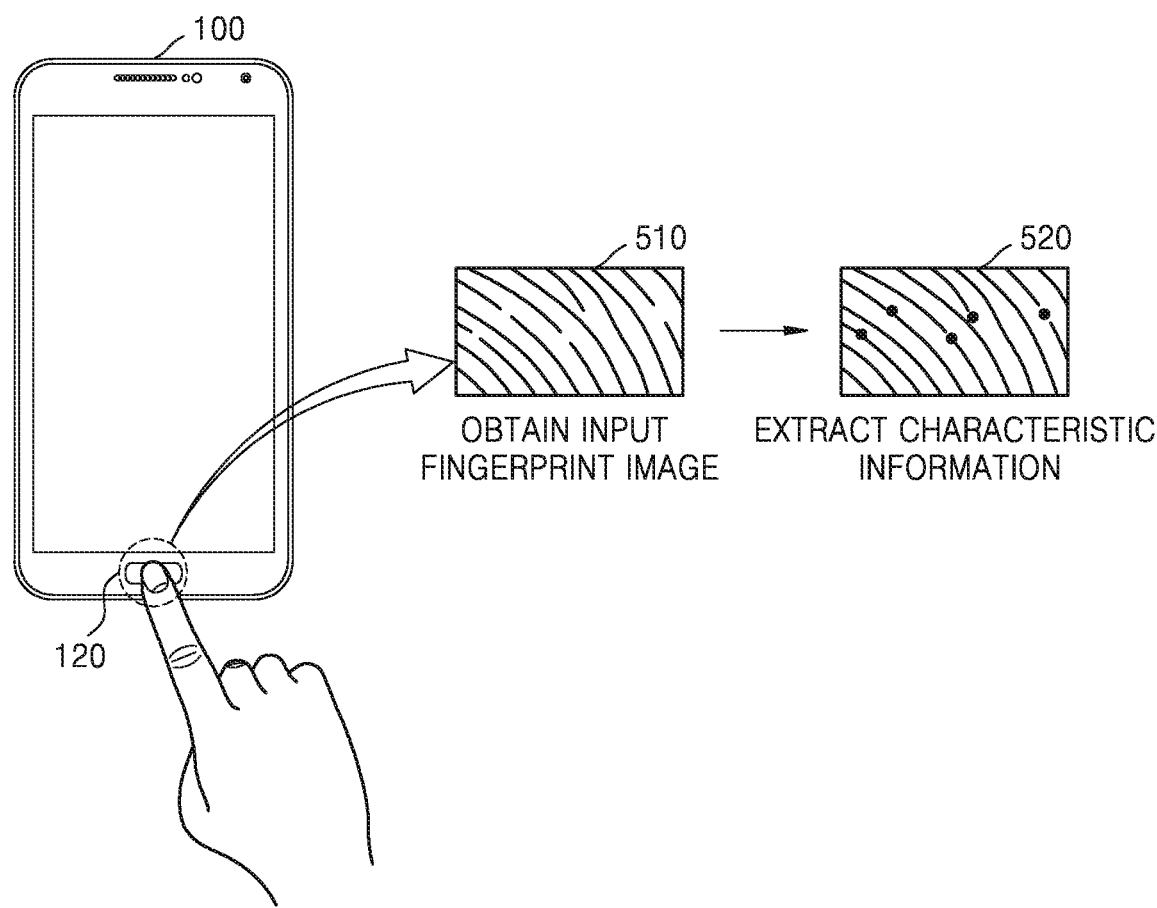
FIG. 5 is a diagram for describing a process of generating an input fingerprint image, according to an embodiment.

FIG. 5 is a diagram for describing a process of generating an input fingerprint image 510, according to an embodiment.

The process of generating the input fingerprint image 510 shown in FIG. 5 may be a process of generating an input fingerprint image by using the electronic device 100 in FIG. 1.

Referring to FIG. 5, the fingerprint sensor 120 in the electronic device 100 may sense a fingerprint of the user's finger that contacts the fingerprint sensing region. The fingerprint sensor 120 may sense a fingerprint that is at least a part of the fingerprint of the user's finger, and an image of the fingerprint that is sensed may be used for generating an input fingerprint image 510.

In FIG. 5, although the input fingerprint image 510 is generated from the fingerprint image that is sensed by using the fingerprint sensor 120 on the home button of the smart phone, it is merely an example and the embodiment is not limited thereto.

In addition, like in operation 440 shown in FIG. 4, quality of the input fingerprint image 510 that is generated by sensing the user's fingerprint by using the fingerprint sensor 120 may be improved such that the ridges and the valleys of the fingerprint are clearly distinguished.

The input fingerprint image 510 may, in the user verification operation, be used for determining whether the input fingerprint image 510 matches the pattern of the registered fingerprint image 441.

After generating the input fingerprint image 510 from the fingerprint image that is sensed by using the fingerprint sensor 120, characteristic information of the fingerprint may be obtained from the input fingerprint image 510. The characteristic information extracted from the input fingerprint image 510 is referred to as input characteristic information 520. The input characteristic information 520, which is information indicating characteristics of the registered fingerprint image 510, may, but is not limited to, be information regarding minutiae. The input characteristic information may include SIFT information, phase information that is extracted from the input fingerprint image 510 based on the frequency domain conversion method, and the like.

In the user verification operation, the input characteristic information 520 may be used for determining similarity between the input characteristic information 520 and the registered characteristic information.

Figure 6:
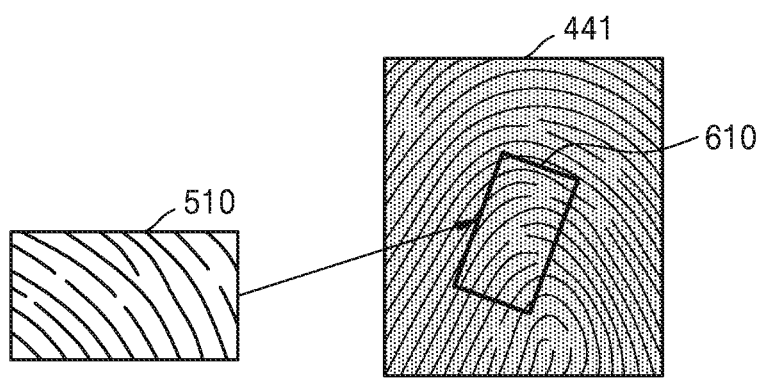
FIG. 6 is a diagram for describing a process of generating a registered superimposed image, according to an embodiment.

FIG. 6 is a diagram for describing a process of generating a registered superimposed image 610, according to an embodiment.

The process of generating the registered superimposed image 610 shown in FIG. 6 may be a process of generating a registered superimposed image by using the electronic device 100 in FIG. 1.

Referring to FIG. 6, the processor 130 in the electronic device 100 may search for a region of the registered fingerprint image 441 that corresponds to a region in which the input fingerprint image 510 exists, thereby determining, from among partial regions of the registered fingerprint image 441, the registered superimposed image 610 that is a partial region of the registered fingerprint image 441 that is superimposed on the input fingerprint image 510. The registered fingerprint image 441, which is generated from the image of a finger that is captured by using the camera 110, can have a size that is larger than that of the input fingerprint image 510 that is generated from the fingerprint image sensed by the fingerprint sensor 120; and thus, to determine whether the fingerprint is verified, the registered fingerprint image 441 in the region corresponding to the input fingerprint image 510 is required. As a result of the determination of the processor 130, the region of the registered fingerprint image 441 that corresponds to the region in which the input fingerprint image 510 exists is referred to as a registered superimposed image 610.

More particularly, the processor 130 in the electronic device 100 may scale, rotate, and/or translate the input fingerprint image 510 such that regions included in common in the input fingerprint image 510 and the registered fingerprint image 441 overlap each other. Alternatively, the processor 130 may scale, rotate, and/or translate the registered fingerprint image 441.

For example, the processor 130 may, by using a Fast Fourier Transform (FFT), convert information in spatial domains in the registered fingerprint image 441 and the input fingerprint image 510 into frequency domain information.

The processor 130 may, by using a Log-Polar Transform (LPT), convert a coordinate system of the frequency domain information that is included in each of the registered fingerprint image 441 and the input fingerprint image into a polar coordinate system. For example, the LPT may be performed with respect to magnitude values of pixels in an FFT image that is derived by the FFT.

Next, the processor 130 may perform the FFT on the registered fingerprint image 441 and the input fingerprint image 510 on which the LPT is performed.

The processor 130 may perform phase correlation between the registered fingerprint image 441 and the input fingerprint image 510, and a peak may be detected as a result of performing the phase correlation. The position of the peak that is detected may indicate rotation information between the registered fingerprint image 441 and the input fingerprint image 510.

According to another embodiment, the position of the peak may also represent scale information between the registered fingerprint image 441 and the input fingerprint image 510. For example, an axis of a Log-Polar converted image may correspond to an angle, and another axis of the Log-Polar converted image may correspond to a radius, and a location of the peak that is detected by the phase correlation may be represented as an ordered pair of $(\varphi, r)$, where $\varphi$ is a coordinate of the axis corresponding to the polar angle, and $r$ is a coordinate of the axis corresponding to the radius. The coordinate of the axis corresponding to the polar angle may indicate rotation information, and the coordinate of the axis corresponding to the radius may indicate scale information.

The processor 130 may, based on the scale information and the rotation information, rotate and scale the input fingerprint image 510. Next, the processor 130 may apply the FFT to the input fingerprint image 510, which is rotated and is scaled, and perform the phase correlation thereon. A peak is detected as a result of the phase correlation, and a position of the peak that is detected may indicate translation information $(Tx, Ty)$ between the registered fingerprint image 441 and the input fingerprint image 510. The processor 130 may, based on the translation information $(Tx, Ty)$, translate the input fingerprint image 510 that is rotated and search the region of the registered fingerprint image 441 that corresponds to the region in which the input fingerprint image 510 exists. However, a method of searching for the region of the registered fingerprint image 441 that corresponds to the region in which the input fingerprint image 510 exists is not limited to the description above, and various methods may be further used.

The processor 130 may, as a result of searching for the region of the registered fingerprint image 441 that corresponds to the region in which the input fingerprint image 510 exists, determine the registered superimposed image 610, from the registered fingerprint image 441, that is superimposed on the input fingerprint image 510. The registered superimposed image 610 may be larger or smaller than the input fingerprint image 510. The registered fingerprint image 441 is generated through the fingerprint image that is captured by the camera 110, and thus, compared to the fingerprint sensor 120 that has the fingerprint sensing region which is relatively narrow, a fingerprint image with a larger region may be obtained. In other words, the registered fingerprint image 441 may have a larger size (e.g., representing a larger portion of a fingerprint image) than the input fingerprint image 510.

The processor 130 of the electronic device 100 may, after determining the registered superimposed image 610, perform heterogeneous image conversion to convert a histogram of the registered superimposed image 610 to have a form that is similar to that of the histogram of the input fingerprint image 510. The heterogeneous image conversion will be described in detail with reference to FIG. 7.

Figure 7:
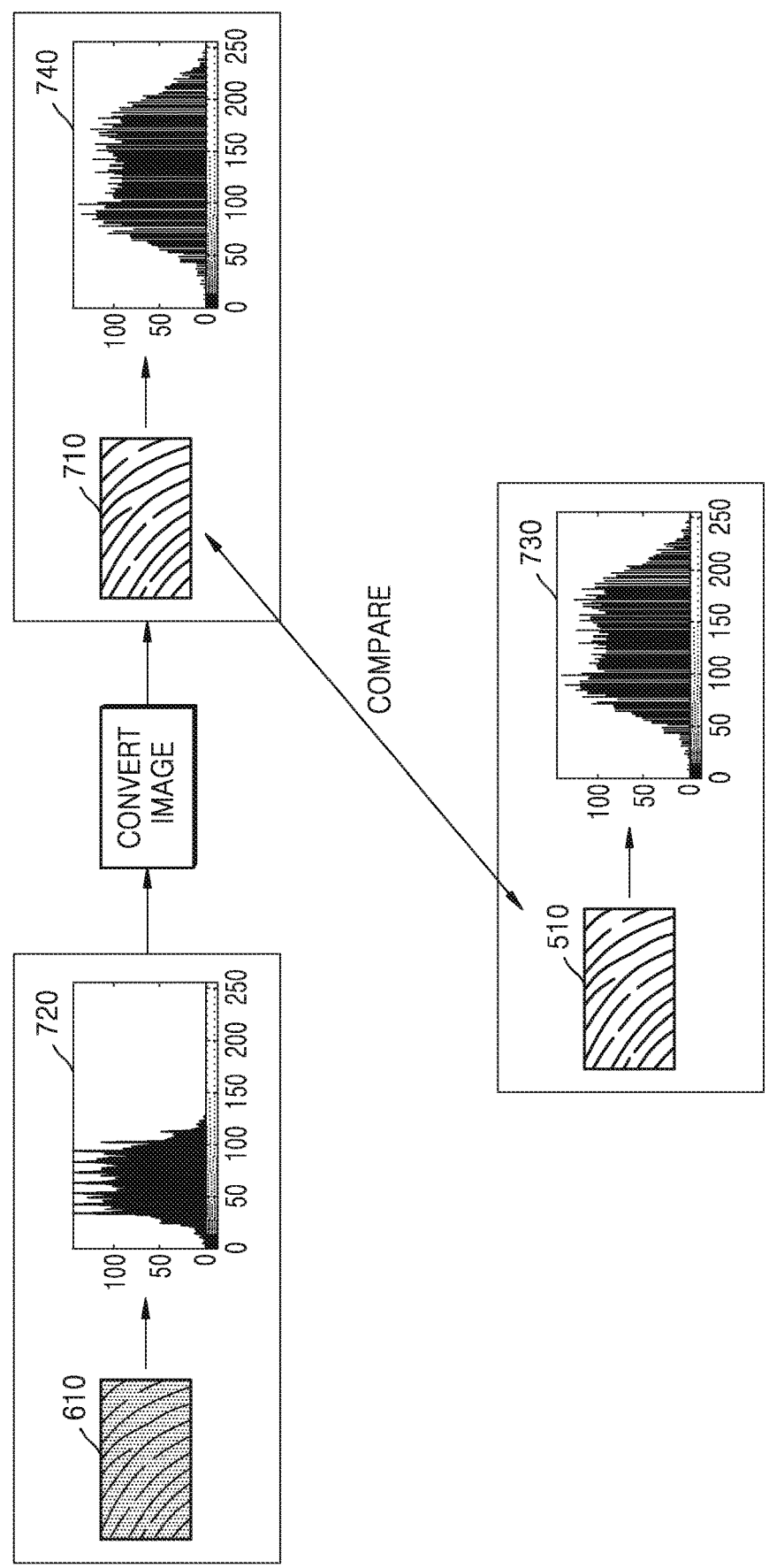
FIG. 7 is a diagram for describing a heterogeneous image conversion process, according to an embodiment.

FIG. 7 is a diagram for describing the heterogeneous image conversion process, according to an embodiment.

FIG. 7 shows histograms respectively indicating the number of pixels for gray levels for the registered superimposed image 610 and the input fingerprint image 510.

Each pixel included in a fingerprint image has a gray level that indicates brightness of a position at which the pixel exists. The horizontal axis of the histogram indicates the gray level, and when the fingerprint image is an 8-bit image, the gray level is a value in a range of 0 to 255, where 0 indicates a darkest state (i.e., black) and 255 indicates a brightest state (i.e., white). The vertical axis indicates the number of pixels within the fingerprint image that has a certain gray level at a position of the horizontal axis.

The registered superimposed image 610 is generated from the fingerprint image that is captured by the camera 110, and the input fingerprint image 510 is generated from the fingerprint image that is sensed by the fingerprint sensor 120 that is capacitive. The registered superimposed image 610 and the input fingerprint image 510, which are generated by using different methods, may have a great gap between the histograms that respectively indicate the number of pixels for the gray level of the registered superimposed image 610 and the number of pixels for the gray level of the input fingerprint image 510.

Accordingly, a finger of the same user may fail in verification, and thus, the heterogeneous image conversion is required to convert the histogram 720 of the registered superimposed image 610 to be similar to the histogram 730 of the input fingerprint image 510, with reference to the histogram 730 of the input fingerprint image 510. On the other hand, the histogram 730 of the input fingerprint image 510 may also be adjusted to be similar to the histogram 720 of the registered superimposed image 610, but FIG. 7 only describes the former.

Referring to FIG. 7, the histogram 720 of the registered superimposed image 610 which is the part of the registered fingerprint image that is superimposed on the input fingerprint image 510 has contrast that is lower than contrast of the input fingerprint image 510 generated from the fingerprint sensor 120, and thus, the histogram 720 of the registered superimposed image 610 would have a gray level average and a gray level variance that are relatively low. On the other, as the input fingerprint image 510 that is generated from the fingerprint sensor 120 has relatively high contrast, a gray level average of the input fingerprint image 510 is higher than the gray level average of the histogram 720 of the registered superimposed image 610, and the pixels are distributed within the gray levels from 0 to 255 in relatively uniform numbers.

The heterogeneous image conversion, by which the processor 130 in the electronic device 100 converts the registered superimposed image 610 such that the histogram 720 of the registered superimposed image 610 has a form (e.g., pattern) that is similar to the form of the histogram 730 of the input fingerprint image 510, may be performed according to Equation 1 below.

$$C(i, j) = \begin{cases} M_0 + \sqrt{\dfrac{VAR_0 \cdot (I(i, j) - M)^2}{VAR}} & \text{if } I(i, j) > M \\ M_0 - \sqrt{\dfrac{VAR_0 \cdot (I(i, j) - M)^2}{VAR}} & \text{if } I(i, j) \leq M \end{cases} \quad [\text{Equation 1}]$$

In Equation 1, $I(i, j)$ may indicate a gray level of a pixel at a coordinate $(i, j)$ within an initial image before the heterogeneous image conversion. $C(i, j)$ may indicate a gray level of the pixel at the coordinate $(i, j)$ within a converted image that is generated after the heterogeneous image conversion.

M may indicate a gray level average of the pixels in the initial image and VAR may indicate a gray level variance of the pixels in the initial image. As results of the conversation, $M_0$ and $VAR_0$ may respectively indicate a gray level average and a gray level variance of pixels in a target conversion image.

In FIG. 7, as the processor 130 is used for converting the registered superimposed image 610, $I(i, j)$ indicates a gray level of a pixel at a coordinate $(i, j)$ of the registered superimposed image 610 and $C(i, j)$ indicates a gray level of a pixel at a coordinate $(i, j)$ of a registered conversion image 710 that is generated by the heterogeneous image conversion.

M indicates a gray level average of pixels in the registered superimposed image 610 and VAR indicates a gray level variance of the pixels in the registered superimposed image 610.

As the processor 130 converts the registered superimposed image 610 such that the histogram 720 of the registered superimposed image 610 has a form that is similar to that of the histogram 730 of the input fingerprint image 510, $M_0$ and $VAR_0$ may respectively be a gray level average and a gray level variance of the pixels in the input fingerprint image 510.

The processor 130 in the electronic device 100 may, as it is described above, may generate the registered conversion image 710 by the heterogeneous image conversion. As a result of the heterogeneous image conversion, the histogram 740 of the registered conversion image 710 has a form that is similar to that of the histogram 730 of the input fingerprint image 510.

In this case, when a gap between the gray level average of the pixels in the registered conversion image 710 and the gray level average of the pixels in the input fingerprint image 710 and a gap between the gray level variance of the pixels in the registered conversion image 710 and the gray level variance of the pixels in the input fingerprint image 510 are respectively within a certain threshold, the histogram 740 of the registered conversion image 710 may be considered as having a form that is similar to that of the histogram 730 of the input fingerprint image 510.

The processor 130 may determine whether the input fingerprint image 510 is verified by comparing the registered conversion image 710 with the input fingerprint image 510. Details thereof will now be described with reference to FIG. 8.

Figure 8:
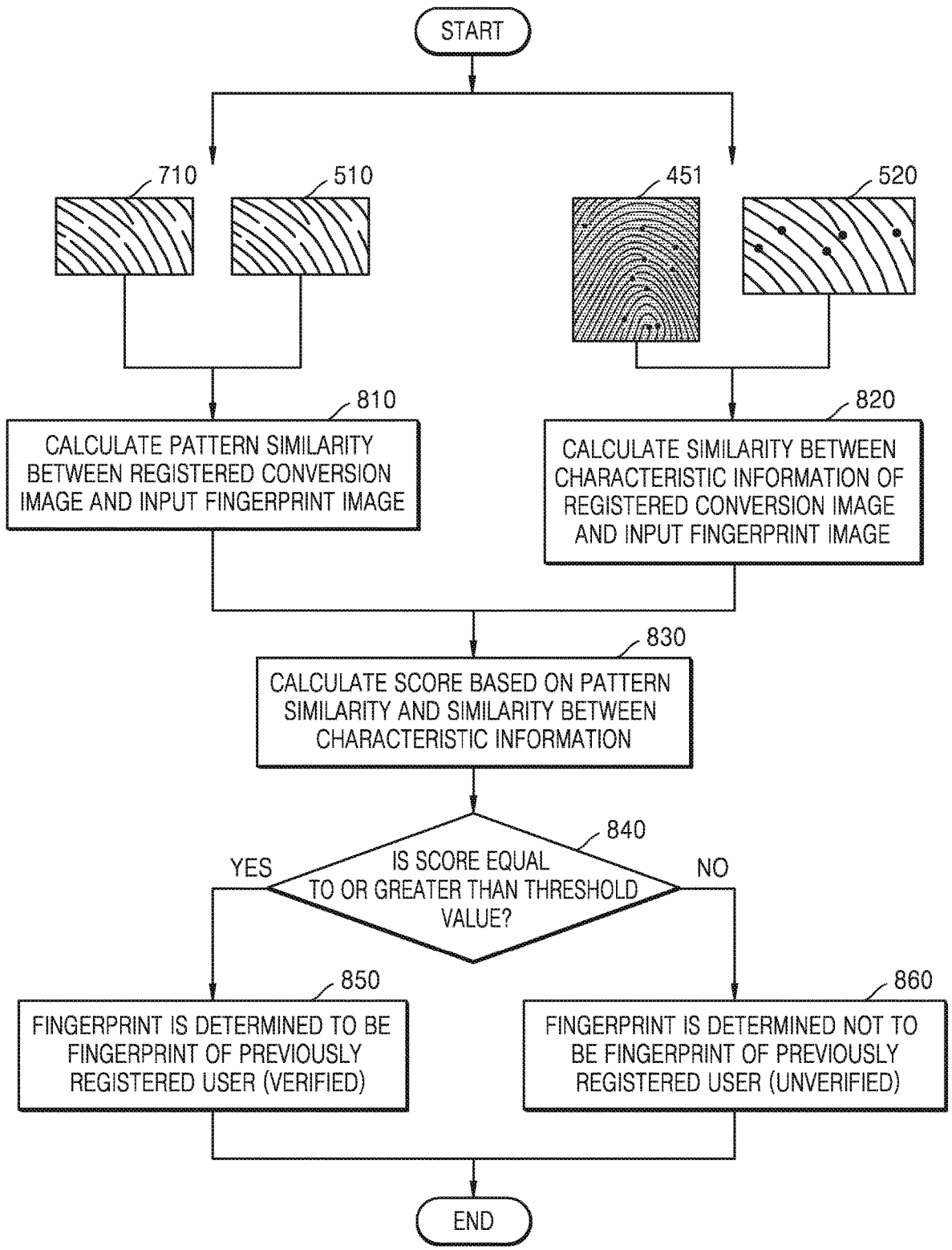
FIG. 8 is a flowchart for describing a process of determining whether the input fingerprint image is verified, according to an embodiment.

FIG. 8 is a flowchart describing a process of determining whether the input fingerprint image 510 is verified, according to an embodiment.

Referring to FIG. 8, in the verification operation, the processor 130 in the electronic device 100 may determine whether the input fingerprint image 510 is verified by calculating the matching degree between the input fingerprint image 510 and the previously registered users' fingerprints.

More particularly, the processor 130 may determine whether the input fingerprint image 510 is verified, based on pattern similarity between the registered conversion image 710 and the input fingerprint image 510 and similarity between the registered characteristic information 451 of the registered fingerprint image 441 and the input characteristic information 520 of the input fingerprint image 510. As it is described above, the verification of the fingerprint is determined by considering both the pattern similarity and the similarity between the registered characteristic information 451 of the registered fingerprint image 441 and the input characteristic information 520 of the input fingerprint image 510, and thus, security may be improved.

In operation 810, the processor 130 in the electronic device 100 may calculate the pattern similarity between the registered conversion image 710 and the input fingerprint image 510. The registered conversion image 710 is an image that is generated by converting the registered superimposed image 610 such that the histogram of the registered superimposed image 610 has a form that is similar to that of the histogram of the input fingerprint image 510.

The processor 130 may, as represented in Equation 2, calculate the pattern similarity between the registered conversion image 710 and the input fingerprint image 510.

$$R1 = \dfrac{\sum\limits_{x',y'} (E(x', y') \cdot I(x', y'))}{\sqrt{\sum\limits_{x',y'} E(x', y')^2 \cdot \sum\limits_{x',y'} I(x', y')^2}} \quad [\text{Equation 2}]$$

In Equation 2 as defined above, (x', y') may indicate a position of a pixel that is included in each of the registered conversion image 710 and the input fingerprint image 510. E(x', y') may indicate a gray level of a pixel at the coordinate (x', y') in the registered conversion image 710 and I(x', y') may indicate a gray level of a pixel at the coordinate (x', y')

in the input fingerprint image 510. R1 may indicate a normalized cross-correlation value between the pixels at the same coordinates in the input fingerprint image 510 and the registered conversion image 710.

R may have a greater value as the similarity between the pixels of the input fingerprint image 510 and the registered conversion image 710 increases. However, calculating the similarity is not limited to Equation 2 that is described above, and various methods may be used for indicating the similarity.

As the histogram of the registered conversion image 710 has a form that is similar to that of the histogram of the input fingerprint image 510 through the heterogeneous image conversion, when the verification of the fingerprint is determined based on the pattern similarity between the registered conversion image 710 and the input fingerprint image 510, a verification rate (i.e., rate of accurate verification) with more stability and consistency may be achieved.

In operation 820, the processor 130 may calculate the similarity between the registered characteristic information 451 of the registered fingerprint image 441 stored in the memory 140 and the input characteristic information 520 of the input fingerprint image 510. The characteristic information may include at least one of the minutiae information, the SIFT information, and the phase information that is obtained based on the frequency domain conversion method.

In an embodiment, similarity between the minutiae information obtained respectively from the registered fingerprint image and the input fingerprint image 510 may be calculated. The minutiae are a plurality of points in which directional properties and positions of points at which the ridges diverge, end, and/or start are stored. The minutiae may be identified according to criteria that are consistently applied across multiple fingerprints.

Similarity R2 may have a greater value according to an increase in the number of minutiae that match one another from among the minutiae of the registered fingerprint image 441 and the input fingerprint image 510. For example, the similarity R2 may have a value between 0 and 1. When the number of minutiae that match one another is 0, the similarity R2 may be 0, and when the number of minutiae that match one another is 10 (e.g., a predetermined upper boundary), the similarity R2 may be 1. However, the method of calculating the similarity is merely an example, and various methods may be used for calculating the similarity.

In operation 830, the processor 130 may calculate a score that indicates the matching degree (i.e., degree of similarity) between the input fingerprint image 510 and the registered fingerprint image 441, based on the pattern similarity between the patterns of the registered conversion image 710 and the input fingerprint image 510, which is calculated in operation 810, and the similarity between the characteristic information of the registered fingerprint image 441 and the input fingerprint image 510 that is calculated in operation 820. For example, the score may, but is not limited to, be a sum of R1 and R2, and various methods may be used for calculating the score.

In operation 840, the processor 130 may determine whether the score is greater than or equal to a threshold. The threshold may be previously determined as a value that is a reference for determining equality between the input fingerprint image 510 and the registered fingerprint image 441. When the score is greater than or equal to the threshold, operation 850 is performed; and when the score is less than the threshold, operation 860 is performed.

In operation 850, the processor 130 may determine that the input fingerprint image 510 is a fingerprint of the previously registered user. In this case, the processor 130 may determine that the fingerprint is verified.

In operation 860, the processor 130 may determine that the input fingerprint image 510 is not the fingerprint of the previously registered user. In this case, the processor 130 may determine that the fingerprint is not verified.

Figure 9:
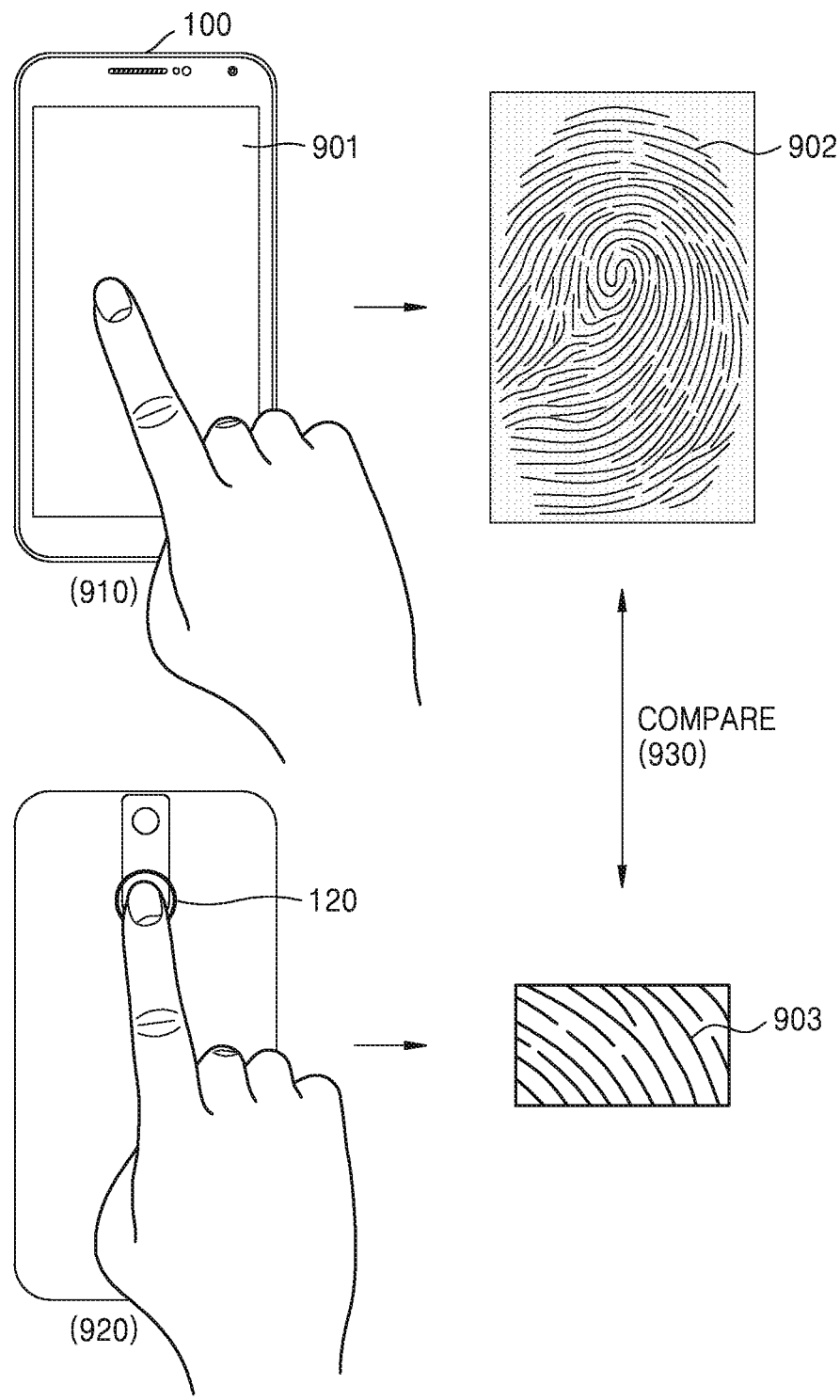
FIG. 9 is a diagram for describing a process of fingerprint recognition by using the electronic device, according to an embodiment.

FIG. 9 is a diagram for describing the process of recognizing the fingerprint by using the electronic device 100, according to an embodiment.

FIGS. 1 through 8 are used for describing the embodiment that includes shooting the fingerprint image by using the camera 110, obtaining the registered fingerprint image from the fingerprint image that is shot, and obtaining the fingerprint image by using the fingerprint sensor 120. However, the embodiment is merely an example and, instead of the camera 110, another type of fingerprint sensor that may obtain a fingerprint image having a wide region may be used. For example, the other fingerprint sensor may be an optical fingerprint sensor like an on-screen fingerprint sensor. The on-screen fingerprint sensor, for example, which is an optical sensor in pixels included in an organic light-emitting diode (OLED) display, may have a fingerprint sensing region having a size that is identical to that of a display region of an electronic device such as a smart phone. In addition, a capacitive fingerprint may also be used for obtaining a fingerprint image that has a wide region by using a metal mesh type electrode.

Referring to FIG. 9, the electronic device 100 may include a display 901 in which an on-screen fingerprint sensor is embedded, the fingerprint sensor 120 on the rear surface of the electronic device 100, a memory, and a processor. The fingerprint sensor 120, the memory, and the processor may respectively correspond to the fingerprint sensor 120, the memory 140, and the processor 130 shown in FIG. 1.

In operation 910, the processor 130 in the electronic device 100 may generate a registered fingerprint image 902 by sensing a fingerprint image of a part of the user's finger by using the on-screen fingerprint sensor that is embedded in the display 901.

In operation 920, the processor 130 may generate an input fingerprint image 903 from the fingerprint image that is sensed by using the fingerprint sensor 120 on the rear surface of the electronic device 100.

Although it is omitted in FIG. 9, like in FIG. 6, the processor 130 may search a region of the registered fingerprint image 902 that corresponds to a region of the input fingerprint image 903 and may determine a region of the registered fingerprint image 902 to which the input fingerprint image 903 corresponds. The processor 130 may, as a result of the determination, generate a registered superimposed image that is a region of the registered fingerprint image 902 that corresponds to the input fingerprint image 903.

In operation 930, the processor 130 may determine whether the fingerprint is verified by comparing the registered fingerprint image 902 that is generated in operation 910 with the input fingerprint image 903 that is generated in operation 920. More particularly, the processor 130 may determine whether the fingerprint is verified, based on pattern similarity between the registered superimposed image and the input fingerprint image 903, which are generated from the registered fingerprint image 902, and similarity between characteristic information of the registered fingerprint image 902 and characteristic information of the input fingerprint image 903.

Figure 10:
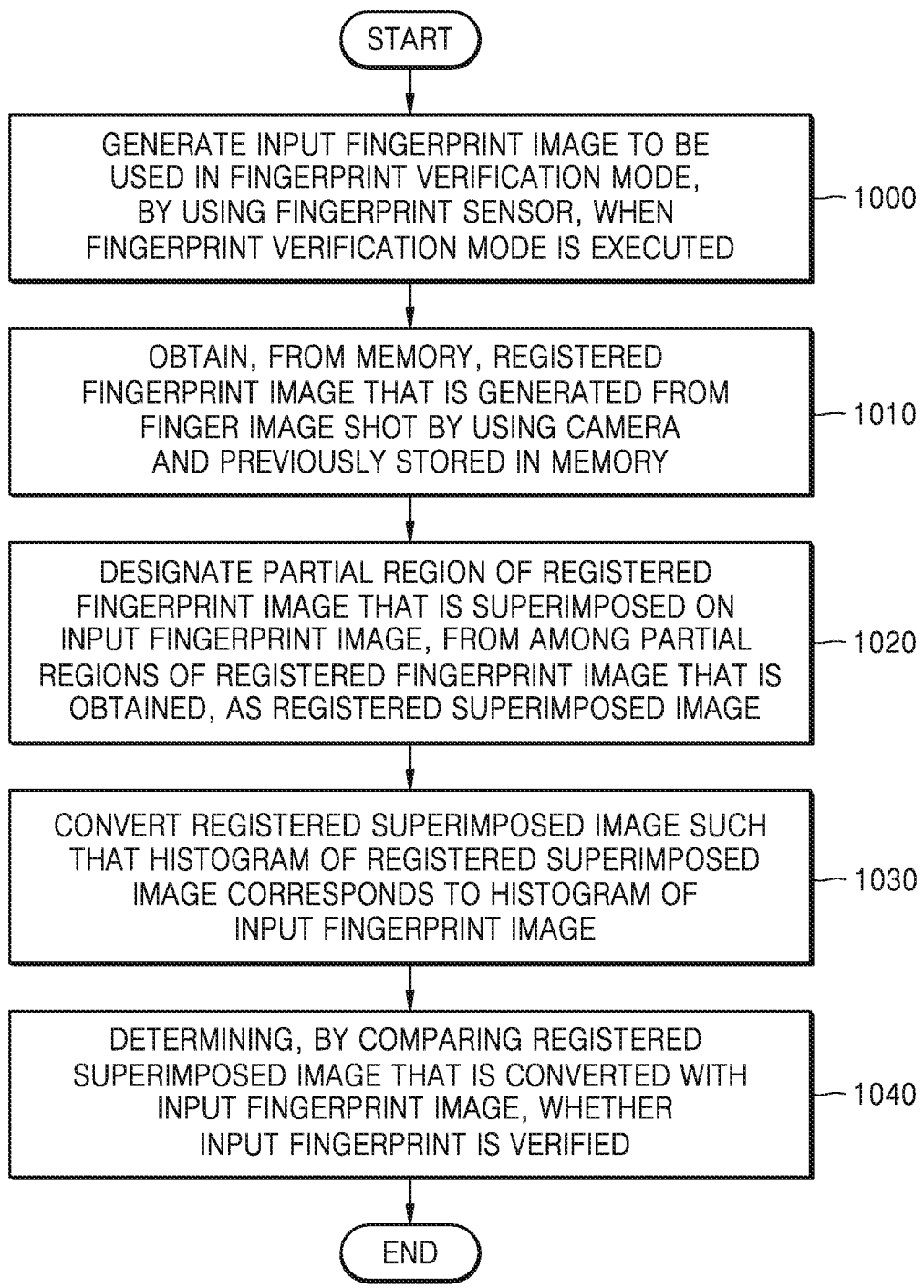
FIG. 10 is a flowchart of a process of recognizing a fingerprint in the electronic device, according to an embodiment.

FIG. 10 is a flowchart for describing a process of recognizing a process by using the electronic device 100 according to an embodiment.

In operation 1000, when the fingerprint verification mode is executed, the processor 130 may, by using the fingerprint sensor 120, generate an input fingerprint image that is to be used in the fingerprint verification mode. When the user attempts to verify his/her fingerprint, the fingerprint sensor 120 may sense a part of the user's finger by using the sensing region. The input fingerprint image of the user, which is generated by using the fingerprint sensor 120, may be an image that occupies a region that is smaller than that of the user fingerprint image that is previously registered by using the camera 110.

In operation 1010, the processor 130 in the electronic device 100 may, from the memory 140, obtain the registered fingerprint image that is generated from the finger image that is shot by using the camera 110 and previously stored in the memory 140. The processor 130 may select a certain ROI from the fingerprint image of the user that is obtained from the camera 110 and may, for example, convert the fingerprint image, which is a color image corresponding to the ROI, into a grayscale image. As the camera 110 may shoot the fingerprint image, a registered fingerprint image having a wide region may be generated. The input fingerprint image that is generated may be stored in the memory 140 in the electronic device 100. In addition, characteristic information regarding the fingerprint, such as minutiae, may be extracted from the registered fingerprint image, and the characteristic information that is extracted may be stored in the memory. In the fingerprint verification operation, the processor 130 may, from the memory 140, obtain the registered fingerprint image that is stored in the memory 140 and compare the registered fingerprint image with the input fingerprint image that is generated in the fingerprint verification mode.

In operation 1020, the processor 130 may designate a partial region of the registered fingerprint image that is superimposed on the input fingerprint image, from among partial regions of the registered fingerprint image that is obtained, as a registered superimposed image. The processor 130 may search a region of the registered fingerprint image that corresponds to the input fingerprint image, thereby determining the position of the registered fingerprint image in which the input fingerprint image exists. By doing so, the registered superimposed image, which is a region of the registered fingerprint image that corresponds to the input fingerprint image, may be determined and designated.

In operation 1030, the processor 130 may convert the registered superimposed image such that a histogram of the registered superimposed image corresponds to the histogram of the input fingerprint image. The registered superimposed image and the input fingerprint image, which are respectively generated from the camera 110 and the fingerprint sensor 120, have a wide gap between the forms of the histograms respectively indicated by the registered superimposed image and the input fingerprint image. As the result of the heterogeneous image conversion, the histogram of the registered conversion image may have a form that is similar to that of the histogram of the input fingerprint image.

In operation 1040, the processor 130 may determine whether the input fingerprint image is verified by comparing the registered superimposed image, which is converted, with the input fingerprint image. More particularly, a score that indicates a degree by which the input fingerprint image matches the registered fingerprint image may be calculated based on the pattern similarity between the registered conversion image and the input fingerprint image and the similarity between the characteristic information of the registered fingerprint image and the characteristic information of the input fingerprint image. When the score is greater than or equal to a threshold, the input fingerprint may be determined as verified (i.e., authenticated), and when the score is less than the threshold, the input fingerprint image may be determined as unverified.

The embodiments described above may be made by a program that may be executed in a computer and may be implemented in a widely used digital computer that operates the program by using a computer-readable recording medium. In addition, the structure of the data used in the embodiment described above may be recorded, via various units, to the computer-readable recording medium. The computer-readable recording medium includes a storage medium, for example, a magnetic storage medium (for example, ROM, floppy disk, hard disk, and the like), an optical reading medium (for example, CD-ROM, digital video disc (DVD), and the like), and the like.

The present disclosure has been particularly shown and described with reference to exemplary embodiments thereof. It will be understood by one of ordinary skill in the art that the present disclosure may be embodied in various modification without departing from the principles of the present disclosure. Hence, the embodiments are illustrative of the present disclosure and are not to be construed as limiting thereof. The scope of the present disclosure is indicated by the claims rather than by the detailed description, and it should be understood that differences within an equivalent scope of the present disclosure are included in the present disclosure.

What is claimed is:

1. A method of recognizing a fingerprint, the method comprising:
generating, by using a fingerprint sensor, an input fingerprint image that is to be used when a fingerprint verification mode is executed;
obtaining, from a memory, a registered fingerprint image that is generated from a finger image captured by a camera and stored in the memory prior to the generating the input fingerprint image;
determining, from among partial regions of the registered fingerprint image that is obtained, a partial region of the registered fingerprint image, which is superimposed on the input fingerprint image, as a registered superimposed image;
converting the registered superimposed image such that a first histogram of the registered superimposed image corresponds to a second histogram of the input fingerprint image; and
determining, by comparing the registered superimposed image, which is converted, with the input fingerprint image, whether the input fingerprint image is verified,
wherein the converting comprises converting the registered superimposed image such that a first gray level average and a first gray level variance of the first histogram for first pixels in the registered superimposed image have values within a certain threshold range, based on a second gray level average and a second gray level variance, respectively, of the second histogram for second pixels in the input fingerprint image.

2. The method of claim 1, wherein a first size of a first fingerprint region of the registered fingerprint image is larger than a second size of a second fingerprint region of the input fingerprint image.

3. The method of claim 1, wherein the registered fingerprint image is formed by selecting, from the finger image, a region of interest (ROI) that corresponds to a fingerprint region and converting the ROI into a grayscale image.

4. The method of claim 1, further comprising:
extracting registered characteristic information from the registered fingerprint image that is obtained; and
extracting input characteristic information from the input fingerprint image that is generated,
wherein the registered characteristic information is extracted from a first fingerprint region of the registered fingerprint image that is larger than a second fingerprint region of the input fingerprint image.

5. The method of claim 4, wherein the registered characteristic information comprises first minutiae of the registered fingerprint image,
wherein the input characteristic information comprises second minutiae of the input fingerprint image, and
wherein a first number of the first minutiae in the registered fingerprint image is greater than a second number of the second minutiae in the input fingerprint image.

6. The method of claim 1, wherein the determining the registered superimposed image comprises:
searching for a region of the registered fingerprint image that corresponds to the input fingerprint image; and
designating the region of the registered fingerprint image as the registered superimposed image,
wherein the searching for the region of the registered fingerprint image is performed based on at least one of translation information, rotation information, and scale information between the registered fingerprint image and the input fingerprint image.

7. The method of claim 1, wherein the determining whether the input fingerprint image is verified comprises:
determining whether the input fingerprint image is verified, based on at least one of first similarity between a first fingerprint pattern of the registered superimposed image that is converted and a second fingerprint pattern of the input fingerprint image, and second similarity between first characteristic information of the registered fingerprint image and second characteristic information of the input fingerprint image.

8. The method of claim 7, wherein the first similarity is determined based on a normalized cross-correlation value of pixels located at same coordinates between the registered superimposed image that is converted and the input fingerprint image,
wherein the first characteristic information of the registered fingerprint image comprises first minutiae of the registered fingerprint image, and the second characteristic information of the input fingerprint image comprises second minutiae of the input fingerprint image, and
wherein the second similarity is determined based on a comparison between a first number of the first minutiae and a second number of the second minutiae.

9. A non-transitory computer-readable recording medium storing instructions which, when executed by a processor, cause the processor to perform operations comprising:
generating, by using a fingerprint sensor, an input fingerprint image that is to be used when a fingerprint verification mode is executed;
obtaining, from a memory, a registered fingerprint image that is generated from a finger image captured by a camera and stored in the memory prior to the generating the input fingerprint image;
determining, from among partial regions of the registered fingerprint image that is obtained, a partial region of the registered fingerprint image, which is superimposed on the input fingerprint image, as a registered superimposed image;
converting the registered superimposed image such that a first histogram of the registered superimposed image corresponds to a second histogram of the input fingerprint image; and
determining, by comparing the registered superimposed image, which is converted, with the input fingerprint image, whether the input fingerprint image is verified,
wherein the converting comprises converting the registered superimposed image such that a first gray level average and a first gray level variance of the first histogram for first pixels in the registered superimposed image have values within a certain threshold range, based on a second gray level average and a second gray level variance, respectively, of the second histogram for second pixels in the input fingerprint image.

10. An electronic device comprising:
a camera configured to capture, in a fingerprint registration mode, a finger image of a user;
a memory configured to store, when the fingerprint registration mode is executed, a registered fingerprint image that is generated from the finger image that is captured by the camera;
a fingerprint sensor configured to sense a fingerprint in a fingerprint verification mode; and
a processor configured to:
generate, by using the fingerprint sensor, an input fingerprint image to be used when the fingerprint verification mode is executed,
obtain, from the memory, the registered fingerprint image that is stored in the memory, prior to the generating the input fingerprint image, in the fingerprint registration mode,
determine, from among partial regions of the registered fingerprint image that is obtained, a partial region of the registered fingerprint image that is superimposed on the input fingerprint image as a registered superimposed image,
convert the registered superimposed image such that a first histogram of the registered superimposed image corresponds to a second histogram of a fingerprint image, and
determine, by comparing the registered superimposed image that is converted with the input fingerprint image, whether the input fingerprint image is verified,
wherein the processor is further configured to convert the registered superimposed image such that a first gray level average and a first gray level variance of the first histogram for first pixels in the registered superimposed image have values within a certain threshold, based on a second gray level average and a second gray level variance, respectively, of the second histogram for second pixels in the input fingerprint image.

11. The electronic device of claim 10, wherein a first size of a first fingerprint region of the registered fingerprint image is larger than a second size of a second fingerprint region of the input fingerprint image.

12. The electronic device of claim 10, wherein the processor is further configured to select, from the finger image, a region of interest (ROI) that corresponds to a fingerprint region and generate the registered fingerprint image by converting the ROI into a grayscale image.

13. The electronic device of claim 10, wherein the processor is further configured to:
    extract registered characteristic information from the registered fingerprint image that is obtained, and
    extract input characteristic information from the input fingerprint image that is generated,
    wherein the registered characteristic information is extracted from a first fingerprint region of the registered fingerprint image that is larger than a second fingerprint region of the input fingerprint image.

14. The electronic device of claim 13, wherein the registered characteristic information comprises first minutiae of the registered fingerprint image,
    wherein the input characteristic information comprises second minutiae of the input fingerprint image, and
    wherein a first number of the first minutiae in the registered fingerprint image is greater than a second number of the second minutiae in the input fingerprint image.

15. The electronic device of claim 10, wherein the processor is further configured to:
    search for a region of the registered fingerprint image that corresponds to the input fingerprint image based on at least one of translation information, rotation information, and scale information between the registered fingerprint image and the input fingerprint image, and
    designate the region of the registered fingerprint image as the registered superimposed image.

16. The electronic device of claim 10, wherein the processor is further configured to determine whether the fingerprint is verified based on first similarity between a first fingerprint pattern of the registered superimposed image that is converted and a second fingerprint pattern of the input fingerprint image, and second similarity between first characteristic information of the registered fingerprint image and second characteristic information of the input fingerprint image.

17. The electronic device of claim 16, wherein the first characteristic information of the registered fingerprint image comprises first minutiae of the registered fingerprint image, and the second characteristic information of the input fingerprint image comprises second minutiae of the input fingerprint image, and
    wherein the processor is further configured to determine the first similarity based on a normalized cross-correlation value of pixels at same coordinates in the registered superimposed image that is converted and the input fingerprint image, and determine the second similarity based on a comparison between a first number of the first minutiae and a second number of the second minutiae.

* * * * *